United States Patent
Bricko et al.

(10) Patent No.: US 9,113,596 B2
(45) Date of Patent: Aug. 25, 2015

(54) HYBRID ELECTRIC TURF MOWER WITH POWER SHED AND POWER BOOST

(71) Applicants: Benjamin A. Bricko, Faribault, MN (US); Kelly S. Meemken, St. Paul, MN (US); James R. Gaebel, Eden Prairie, MN (US)

(72) Inventors: Benjamin A. Bricko, Faribault, MN (US); Kelly S. Meemken, St. Paul, MN (US); James R. Gaebel, Eden Prairie, MN (US)

(73) Assignee: The Toro Company, Bloomington, MN (US)

(*) Notice: Subject to any disclaimer, the term of this patent is extended or adjusted under 35 U.S.C. 154(b) by 0 days.

(21) Appl. No.: 14/215,712

(22) Filed: Mar. 17, 2014

(65) Prior Publication Data

US 2014/0283492 A1    Sep. 25, 2014

Related U.S. Application Data

(60) Provisional application No. 61/792,471, filed on Mar. 15, 2013.

(51) Int. Cl.
*A01D 34/00* (2006.01)
*A01D 75/28* (2006.01)
*A01D 69/02* (2006.01)

(52) U.S. Cl.
CPC .............. *A01D 75/28* (2013.01); *A01D 69/025* (2013.01)

(58) Field of Classification Search
CPC .............................. A01D 34/00; A01D 34/006
USPC ........... 180/65.21, 65.275, 65.28, 65.29, 900; 56/10.6, 10.2 R
See application file for complete search history.

(56) References Cited

U.S. PATENT DOCUMENTS

| | | | |
|---|---|---|---|
| 5,794,422 A * | 8/1998 | Reimers et al. | 56/11.9 |
| 6,820,356 B2 | 11/2004 | Naruse et al. | |
| 7,554,213 B2 * | 6/2009 | Kawakami et al. | 290/40 R |
| 7,594,377 B1 * | 9/2009 | Jansen et al. | 56/10.2 H |
| 7,610,975 B1 * | 11/2009 | Gust et al. | 180/65.245 |
| 7,735,592 B2 * | 6/2010 | Bellot et al. | 180/165 |
| 2012/0227368 A1 * | 9/2012 | Koike et al. | 56/10.2 A |
| 2012/0227369 A1 * | 9/2012 | Koike et al. | 56/10.2 A |
| 2014/0013722 A1 * | 1/2014 | Pitcel et al. | 56/10.6 |
| 2014/0259804 A1 | 9/2014 | Eavenson et al. | |

FOREIGN PATENT DOCUMENTS

JP    2007071197    3/2007

\* cited by examiner

*Primary Examiner* — John Walters
*Assistant Examiner* — Brian Swenson
(74) *Attorney, Agent, or Firm* — James W. Miller

(57) ABSTRACT

A turf mower has one or more electrically powered cutting units and a traction drive system that is operatively powered by an internal combustion engine. A motor generator is also powered by the engine and is operatively connected to the engine and the traction drive system. A battery pack stores electrical energy and is charged by the motor generator during normal mowing on flat ground. When mowing on hillsides with increased mechanical power requirements above that supplied by the horsepower of the engine, a control system first removes the load imposed by the cutting units by supplying the electrical energy to the cutting units from the battery pack instead of the motor generator. If that is insufficient, the control system then uses energy from the battery pack to power the motor generator as a motor to supply additional mechanical power for use by the traction drive system.

12 Claims, 5 Drawing Sheets

Generate Mode
Flat Ground Mowing. System Load ~ 18hp

HYBRID ELECTRIC TURF MOWER WITH POWER SHED AND POWER BOOST

TECHNICAL FIELD

This invention relates to a turf mower that carries one or more grass cutting units with the gang mower having some loads, such as the traction drive load, driven by an engine and other loads representing a significant portion of total load, such as the cutting unit loads, driven by a hybrid electric drive system.

BACKGROUND OF THE INVENTION

Turf mowers comprise one or more cutting units, either reel or rotary cutting units or cutting units comprising individual cutting blades, carried on a frame for cutting grass over a wide cutting swath. In a gang mower configuration, a plurality of cutting units are usually arranged in front and rear rows with the cutting units in each row being laterally spaced from one another if there is more than one cutting unit in each row. The cutting units in the respective rows are laterally staggered relative to the cutting units in the other rows so that the gaps between the cutting units in one row are covered by the cutting unit(s) in another row. This allows the gang configuration of cutting units to cut an unbroken swath of grass during a single pass of the gang mower. Typically, gang mowers of this type comprise riding mowers that are operated by an operator carried on a seat provided on the mower.

Turf mowers of this type traditionally have been powered by an internal combustion engine carried on the frame of the mower, typically either a diesel engine or a gasoline powered engine. In many cases, the engine powers one or more hydraulic pumps that supply pressurized hydraulic fluid to a plurality of hydraulic motors or hydraulic actuators. At least one hydraulic motor powers one or more of the ground engaging wheels of the mower to self-propel the mower over the ground. Other hydraulic motors power the cutting units. Various hydraulic actuators are used in a lift and lower system to raise and lower various lift arms that support the cutting units for movement between a lowered grass cutting position in which the cutting units engage the turf and a raised transport position in which the cutting units are elevated above the turf. Various other hydraulic actuators may be used in a power steering system. The Reelmaster® Series 5010 mowers manufactured and sold by The Toro Company are well known gang mowers of this general type in which the cutting units comprise reel cutting units.

Today, environmental regulations continue to tighten and energy prices continue to rise. For example, the EPA has promulgated a set of stringent emission regulations governing non-road diesel engines known as the Tier IV regulations. Relatively small diesel engines having less than 25 horsepower (hp) are currently able to meet the Tier IV regulations without being unduly expensive. Unfortunately, however, diesel engines having more than 25 hp, which include many diesel engines used in gang mowers, will not meet the Tier IV regulations without the addition of relatively expensive emission reduction equipment. This additional cost will have to be either passed on to customers or absorbed by the manufacturer, neither of which is desirable. It would be an advantage to devise a system that would allow gang mowers that have traditionally been powered by diesel engines over 25 hp to be powered by a diesel engine below 25 hp without the customer feeling or noticing any difference in the performance of the mower or the power characteristics of the mower.

SUMMARY OF THE INVENTION

One aspect of this invention relates to a mower which comprises a frame having a plurality of ground engaging wheels. An internal combustion engine is carried on the frame. An electrical energy generating device is mechanically coupled to the engine for being powered by the engine. An electrical energy storage device is electrically connected to the generating device. At least one grass cutting unit is operatively connected to the frame. At least one electrically powered device is operatively connected to the frame which device is electrically connected to the generating device and to the storage device. A traction drive system is provided for propelling at least one of the ground engaging wheels on the frame. The traction drive system is operatively powered by at least the engine. A control system comprises an engine load sensor and a controller that is operatively connected to the sensor for controlling the operation of the generating device in accordance with engine load. The controller, upon receiving an engine load output signal from the sensor that is indicative of engine load above a first level, shifts at least in part the electrical energy needed to power the at least one electrically powered device from the generating device to the storage device.

Another aspect of this invention relates to a mower which comprises a frame having a plurality of ground engaging wheels. An internal combustion engine is carried on the frame. The internal combustion engine has an output shaft and a nominal horsepower rating. An electrical energy generating device is mechanically coupled to the output shaft of the engine. An electric motor is mechanically coupled to the output shaft of the engine. A traction drive system is provided for propelling at least one of the ground engaging wheels on the frame, the traction drive system being operatively connected to and powered by the output shaft of the engine. An electrical energy storage device is electrically connected to the generating device and to the motor. A plurality of electrically powered grass cutting units are operatively connected to the frame. The cutting units are electrically connected to the generating device and to the storage device. A control system is operatively connected to the generating device and to the motor for controlling the operation of the generating device and the motor. The control system in response to instantaneous mechanical power requirements on the engine during mowing which exceed the nominal horsepower rating of the engine being configured to take at least one of the following two actions: 1.) shifting at least in part the electrical energy needed to power the cutting units from the generating device to the storage device to thereby decrease the instantaneous mechanical power requirements on the engine, and 2.) operating the motor using electrical energy from the storage device to supply mechanical power to the output shaft of the engine that is additive to the mechanical power supplied from the engine itself to more fully meet the instantaneous mechanical power requirements.

BRIEF DESCRIPTION OF THE DRAWINGS

This invention will be described more specifically in the following Detailed Description, when taken in conjunction with the following drawings, in which like reference numerals refer to like elements throughout.

DETAILED DESCRIPTION

Figure 1:
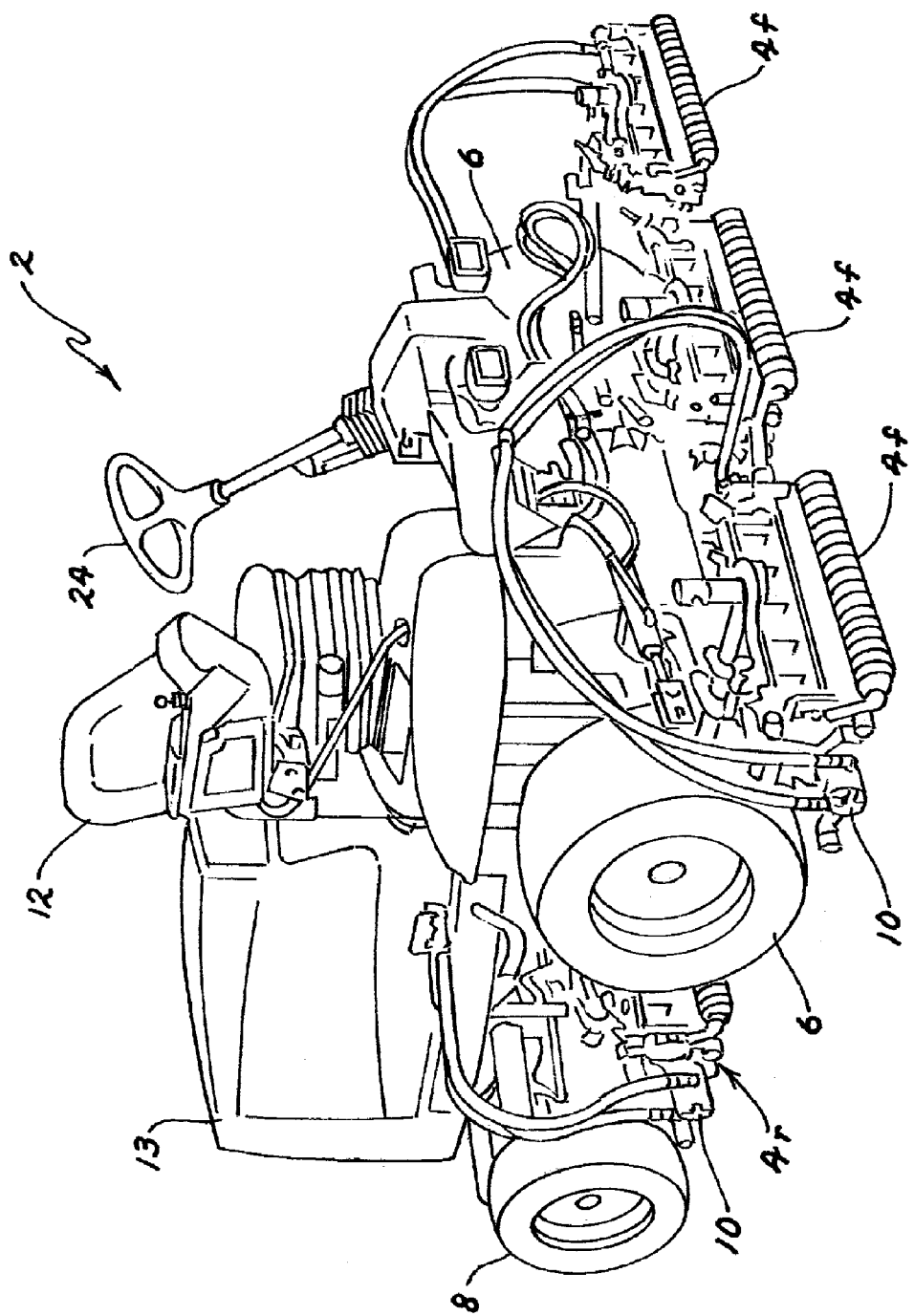
FIG. 1 is a perspective view of a typical gang mower known in the prior art which could be equipped with the hybrid electric system of this invention.

FIG. 1 illustrates a conventional gang mower as 2. Mower 2 incorporates a plurality of cutting units 4 arranged in a 3-2 gang configuration. Such a configuration includes three laterally spaced front cutting units $4_f$ placed in a front row thereof ahead of the front wheels 6 of mower 2. A pair of laterally spaced rear cutting units $4_r$ (one of which can be seen in FIG. 1) is placed in a rear row between front wheels 6 and rear wheels 8 of mower 2. Rear cutting units $4_r$ are staggered to cover the gaps between front cutting units $4_f$ to cut an unbroken swath of grass. Other gang configurations (e.g. a 2-3, 4-3, 3-4, 2-1 or 1-2) could be used.

Cutting units 4 shown in FIG. 1 comprise reel cutting units each of which includes a rotatable cutting reel that pushes standing blades of grass against a fixed bedknife to shear the grass between the reel and the bedknife. Alternatively, cutting units 4 could be rotary cutting decks having at least one grass cutting blade rotating in a horizontal cutting plane about a vertical axis. In yet another form, cutting units 4 could comprise the individual rotary cutting blades in a single rotary cutting deck. Since FIG. 1 depicts a conventional gang reel mower, cutting units 4 are powered by their own individual hydraulic motors 10. However, in this invention, such hydraulic motors 10 will be replaced by electric motors. Cutting units 4 used in mower 2 of this invention, whether reel or rotary cutting units, will be powered by electric motors. If cutting units 4 comprise the individual rotary cutting blades in a single rotary cutting deck, such cutting blades could be powered by their own individual electric motors or by a single electric motor coupled to the blades by a transmission system, such as a belt and pulley drive system.

Figure 2:
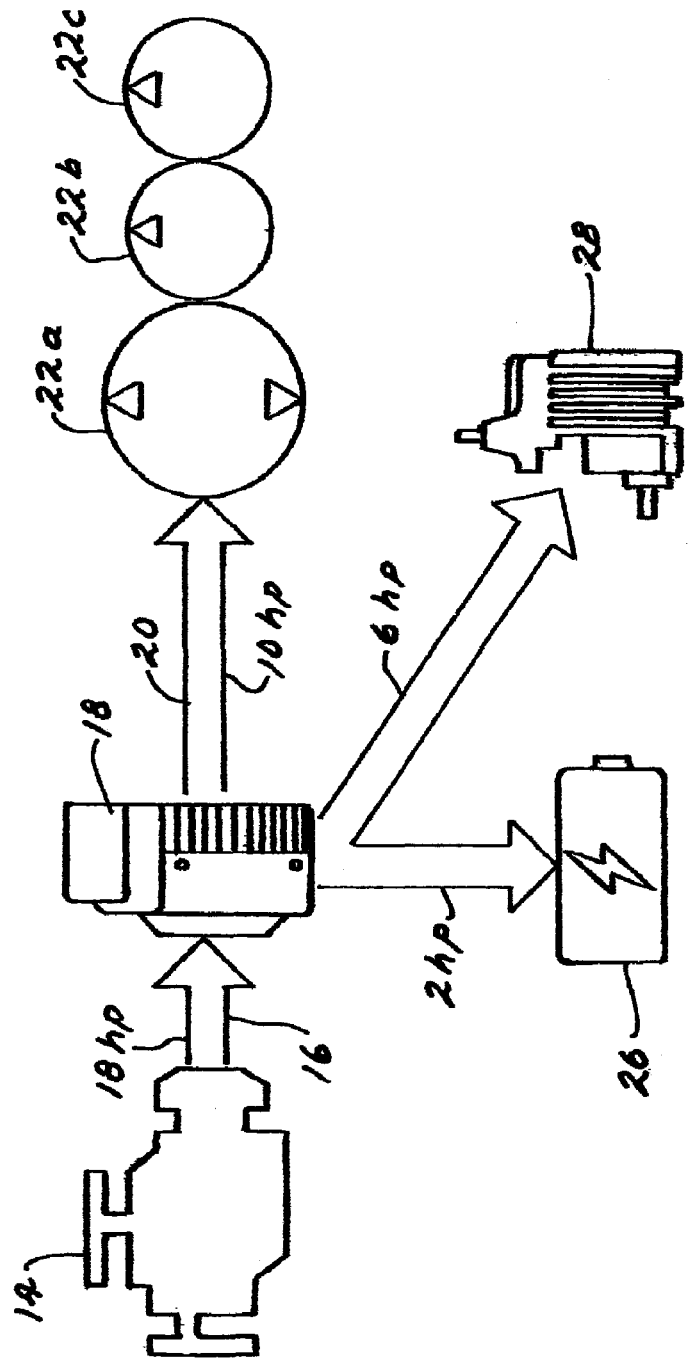
FIG. 2 is a diagrammatic view of the hybrid electric system of this invention operating in a normal load range such as when the mower is mowing on flat ground.
Figure 3:
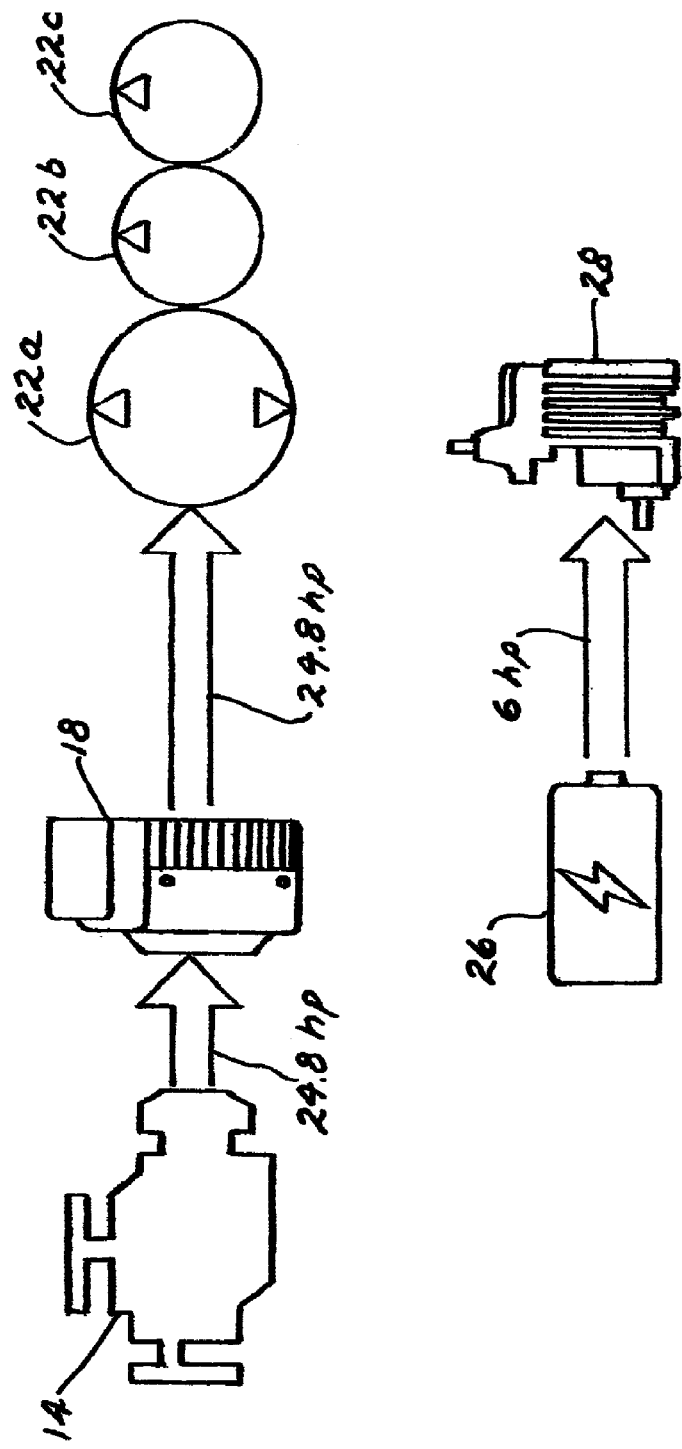
FIG. 3 is a diagrammatic view of the hybrid electric system of this invention operating in a moderately elevated load range such as when the mower is mowing on a moderate hill and the power shed feature is in operation.
Figure 4:
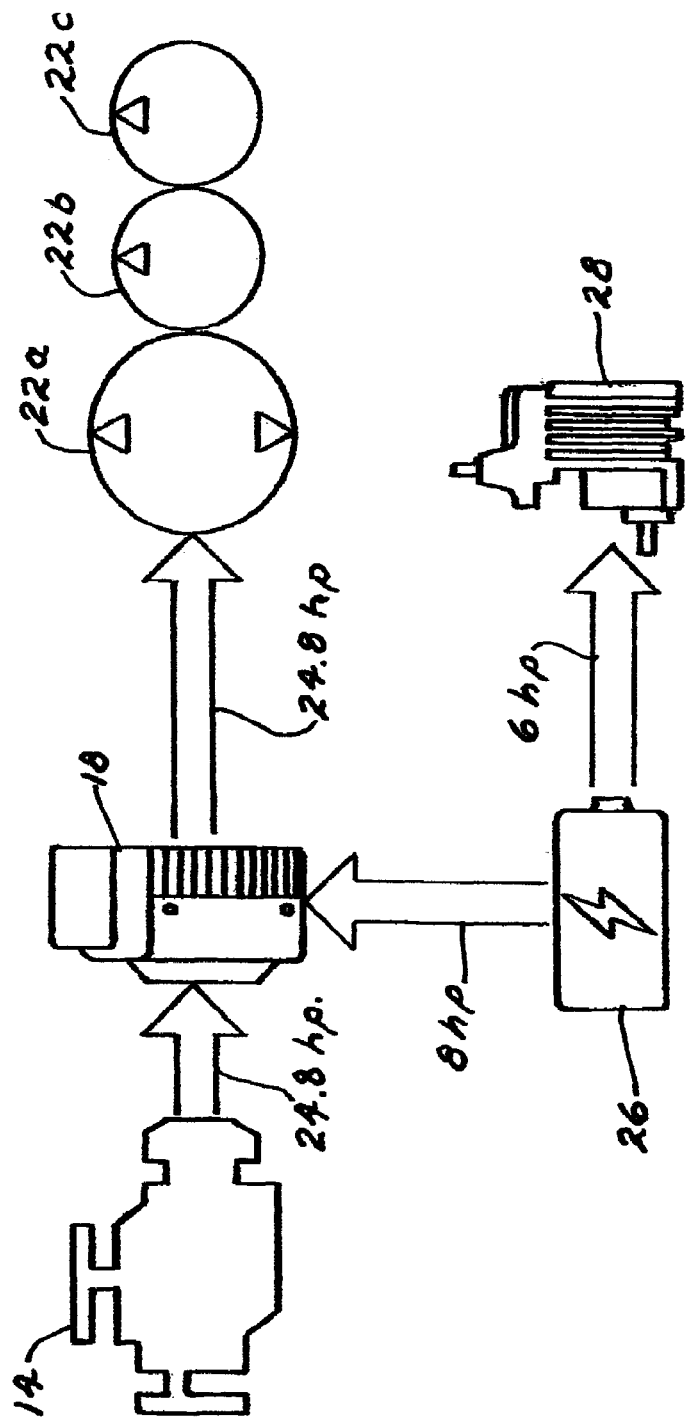
FIG. 4 is a diagrammatic view of the hybrid electric system of this invention operating in an extremely elevated load range such as when the mower is mowing on an extreme hill and the power boost feature is in operation.

Mower 2 includes a seat for carrying 12 an operator who rides atop mower 2. Mower 2 has a rear cowl 13 that encloses an internal combustion engine such as a diesel engine 14. Diesel engine 14 is not shown in FIG. 1 but is shown in FIGS. 2-4. Diesel engine 14 is sized to be at least slightly less than 25 hp (specifically 24.8 hp in the embodiment disclosed in this application) so as to be Tier IV compliant but still be relatively affordable. Diesel engine 14 is somewhat undersized compared to the larger diesel engines (e.g. 35 hp) traditionally used on mowers of this type. The hybrid electric system disclosed in this application will, however, make up or compensate for the undersizing of diesel engine 14 to provide a mower 2 which will, in the perception of the operator, perform as well as mowers with larger diesel engines and thus avoid the perception that mower 2 is underpowered. Note that the specific horsepower descriptions used herein are for illustrative purposes only as the Tier IV regulations also apply to diesel engines of substantially larger size, e.g. 50 hp, 75 hp, etc. Accordingly, the hybrid electric system of this invention would also be usable in these larger engine categories to permit use of a relatively undersized engine when such engine is equipped with the hybrid electric system of this invention compared to the size of the engine that would have been required had the hybrid electric system of this invention not been used.

Referring now to FIG. 2, the hybrid electric system of this invention comprises as its first element the aforementioned diesel engine 14 which engine has an output shaft 16. Engine output shaft 16 is directly coupled to an in-line motor generator (SG) 18. An output shaft 20 of motor generator 18 is connected to the drive shafts of various hydraulic pumps 22. A first pump 22a is a traction drive pump for the purpose of powering one or more hydraulic traction motors for propelling front wheels 4 of mower 2 to allow mower 2 to be self-propelled over the ground. The second pump 22b is a lift and lower pump that powers one or more hydraulic actuators in the form of hydraulic cylinders that lift and lower the various lift arms that individually support each of cutting units 4 for movement between a lowered cutting position and a raised transport position. The third pump 22c is a power steering pump for powering a hydraulic actuator or motor that provides powered assistance to the operator in steering mower 2 through steering input provided by a steering wheel 24. Thus, an in-line mechanical drive system is provided leading from diesel engine 14 to motor generator 18 and from motor generator 18 to the various hydraulic pumps 22.

Motor generator 18 need not necessarily be located between engine 14 and the various hydraulic pumps 22, but could have been located on the opposite side of engine 14 if output shaft 16 of engine 14 had been extended through opposite sides of engine 14 to allow connection of motor generator 18 to either end of output shaft 16. In addition, the in-line placement of motor generator 18 could have been replaced with an arrangement where motor generator 18 was coupled to output shaft 16 by a bi-directional belt drive system. Moreover, while use of an integrated motor generator 18 is preferred for cost reasons, a separate electric motor and a separate generator/alternator could be used in place thereof.

An electrical storage device such as a battery pack 26 or an ultracapacitor is provided on mower 2 for storing electrical power. A lead-acid battery pack 26 is preferred at this time as an economical choice providing sufficient storage and performance. Battery pack 26 consists of four 12V lead acid batteries for a total 48V system. The capacity of the batteries in battery pack 26 dictates the maximum permissible duty cycle and replacement interval.

As can be seen in FIG. 2, motor generator 18 is electrically connected to battery pack 26 to supply electrical energy to battery pack 26 for charging of battery pack 26 during operation of mower 2. Motor generator 18 is also operatively electrically connected to a plurality of electric motors 28 that power cutting units 4. One electric motor 28 is provided on each cutting unit 4 for powering the rotatable cutting reel of each cutting unit 4. Since there are five cutting units 4 in the 3-2 gang mower shown herein, there will be five electric motors 28. Electric motors 28 are all electrically connected in any suitable fashion for receiving electric power from motor generator 18 as well as from battery pack 26. Electric motors 28 comprise an approximately 6-8 hp normal load on diesel engine 14 though this load can peak intermittently as high as 13 hp. For the sake of simplicity, the normal electric motor load will be referred to as 6 hp in FIGS. 2-4. This normal load is a significant load given the approximately 25 hp peak power of diesel engine 14.

While the electrical load in one embodiment of this invention comes from the collective loads of motors 28 powering cutting units 4, such load could come from other electrically powered components on mower 2, either in place of electrically powered cutting units 4 or in addition to cutting units 4. For example, the traction motors used in the traction drive system could be also electric rather than hydraulic motors, such that both the cutting units 4 and the traction drive system are electrically powered. In this case, the total electrical load on engine 14 would consume a substantial majority of the available engine horsepower. Alternatively, the traction drive system could be electrically powered while the cutting units 4 are hydraulically powered using hydraulic rather than electric motors. Other electrical loads can come from electric engine cooling fans, electric lift and lower actuators, electric power steering motors, and the like. The Applicants believe that use of the hybrid electric system of this invention is most applicable when the total electrical load imposed on engine 14 is at least 10% of engine horsepower. In the embodiment disclosed herein where the electrical load comes from a plurality of cutting units 4, such electrical load comprises approximately 25% of engine horsepower.

During a majority of the time when mower 2 is operating and is cutting grass in a turf surface, the load requirements on diesel engine 14 are significantly less than 25 hp. For example, when mower 2 is operating on flat ground and is cutting grass in typical turf conditions, mower 2 operates very well using significantly less than the peak horsepower of diesel engine 14. For example, referring to FIG. 2, all of the load from the hydraulically driven systems may only be approximately 10 hp. That load along with the 6 hp or so required by the normal load of electric motors 28 and the approximately 2 hp needed to charge battery pack 26 will total only about 18 hp. In operation in this usual or normal mode, the total horsepower requirements of 18 hp from diesel engine 14 will be comfortably under the 24.8 hp diesel engine 14 is capable of producing. Thus, mower 2 will provide good grass cutting performance with the electrical power being consumed by electric motors 28 coming from motor generator 18 and with motor generator 18 still charging battery pack 26 in its usual fashion. As noted before, this normal mode of operation is that which is encountered by mower 2 over a majority of the time it is operating.

However, mower 2 will be forced to operate in conditions that begin to demand more power from diesel engine 14 than diesel engine 14 can deliver at peak horsepower. For example, when mower 2 is mowing on a moderate hill, the loads from the hydraulically driven systems, primarily the traction drive load, can dramatically increase. The moderately elevated load diagram of FIG. 3 represents a situation where the loads from the hydraulically driven systems have increased to the full 24.8 hp rating of diesel engine 14. This leaves no power available for driving motor generator 18, thereby effectively rendering cutting units 4 without sufficient power to operate. The result is a dramatic reduction in the grass cutting ability of mower 2 and/or unanticipated slowing of mower 2 while on the moderate hill.

In this condition as shown in FIG. 3, the hybrid electric system of this invention implements a power shed feature under the control of an electronic controller of some type that controls the operation of motor generator 18. The controller may be a microprocessor based controller which is either separate from motor generator 18 or is built into or integrated with motor generator 18 to form a part thereof. The power shed feature is simply a method of shifting the electrical energy source for electric motors 28 from motor generator 18 to battery pack 26 during periods of high demand as illustrated in FIG. 3. The power shed feature does not operate in a full on/full off manner as is diagrammatically illustrated in FIG. 3, but is rather a gradual, transparent and proportional transfer of the electrical energy supplied to electric motors 28 from motor generator 18 to battery pack 26. This transfer occurs as a function of engine load. Engine load is preferably sensed by monitoring proportional fuel solenoid current in the electronic governor of diesel engine 14. As the fuel solenoid current increases from a predetermined set or nominal value, the electrical output power of motor generator 18 is proportionally reduced by the controller which acts on motor generator 18 to proportionally reduce the output voltage of motor generator 18. This controller action can take place substantially immediately upon detecting fuel solenoid current increases above a predetermined set or nominal value or can alternatively be delayed until engine rpm droop in excess of a certain predetermined small threshold amount is additionally detected in any suitable manner and reported to the controller.

Combining an E-governor as an indicator of engine load to control the output of energy from motor generator 18 in the power shed feature allows for eventual complete transfer to battery pack 26 as the source of the electric energy flow to electric motors 28 (as depicted in FIG. 3) with acceptably small engine droop. In effect, the shedding of the load of electric motors 28 from diesel engine 14 to battery pack 26 allows the hybrid electric system of this invention to provide, at least temporarily, for more power than the rated horsepower of diesel engine 14. Again, referring to FIG. 3, even though the hydraulically driven systems are taking the full rated horsepower capacity of diesel engine 14, the 6 hp requirements of electric motors 28 have been removed from diesel engine 14 due to the decrease to zero in the output of motor generator 18 and are now being borne by the stored energy in battery pack 26. The lack of substantial engine droop in this situation compared to the engine droop that would have occurred had the power shed feature not been implemented creates a sense of sufficient engine power, saves energy, and reduces fuel consumption. In other words, the operator detects no difference in how well mower 2 is cutting or the speed at which it is travelling as the electrical power transfer noted above is seamless and undetectable to the operator. As a result, mower 2 simply does not appear to the operator to be underpowered as it will perform as well as gang mowers having larger diesel engines.

Of course, even more extreme operational conditions can be encountered by mower 2, such as when moving up an even higher hill than the moderate hill which is the assumption for the FIG. 3 scenario. As shown in FIG. 4, in an extreme load condition, the load requirements form the hydraulically driven systems (again primarily the traction load drive) can substantially exceed the rated 24.8 hp of diesel engine 14. For the sake of the FIG. 4 example, let's assume that this extreme load mode requires 32.8 hp from diesel engine 14. Diesel engine 14 alone can only deliver 24.8 hp.

In this extreme load situation, the reel mower equipped with the electric hybrid system of this invention now implements a power boost mode. In this mode, the electric energy stored in battery pack 26 still flows to electric motors 28 to keep electric motors 28 operating in a normal fashion in the power shed mode, but is also applied to motor generator 18 to begin powering motor generator 18 as a motor in the power boost mode. Thus, in the example of FIG. 4, the power available to power the drive shafts of hydraulic pumps 22 is additive, i.e. the 24.8 hp of diesel engine 14 and another 8 hp that can be supplied from motor generator 18 operating as a motor, to supply the total of 32.8 hp then being instantaneously required by the hydraulically driven systems. With the other 6 hp being delivered to electric motors 28 from motor generator 18, the hybrid electric system of this invention is capable of providing in FIG. 4 a total of almost 39 hp. Thus, mower 2 even in these extreme load conditions will appear to the operator to function as before. Mower 2 will cut grass well and retain its speed without engine droop.

Figure 5:
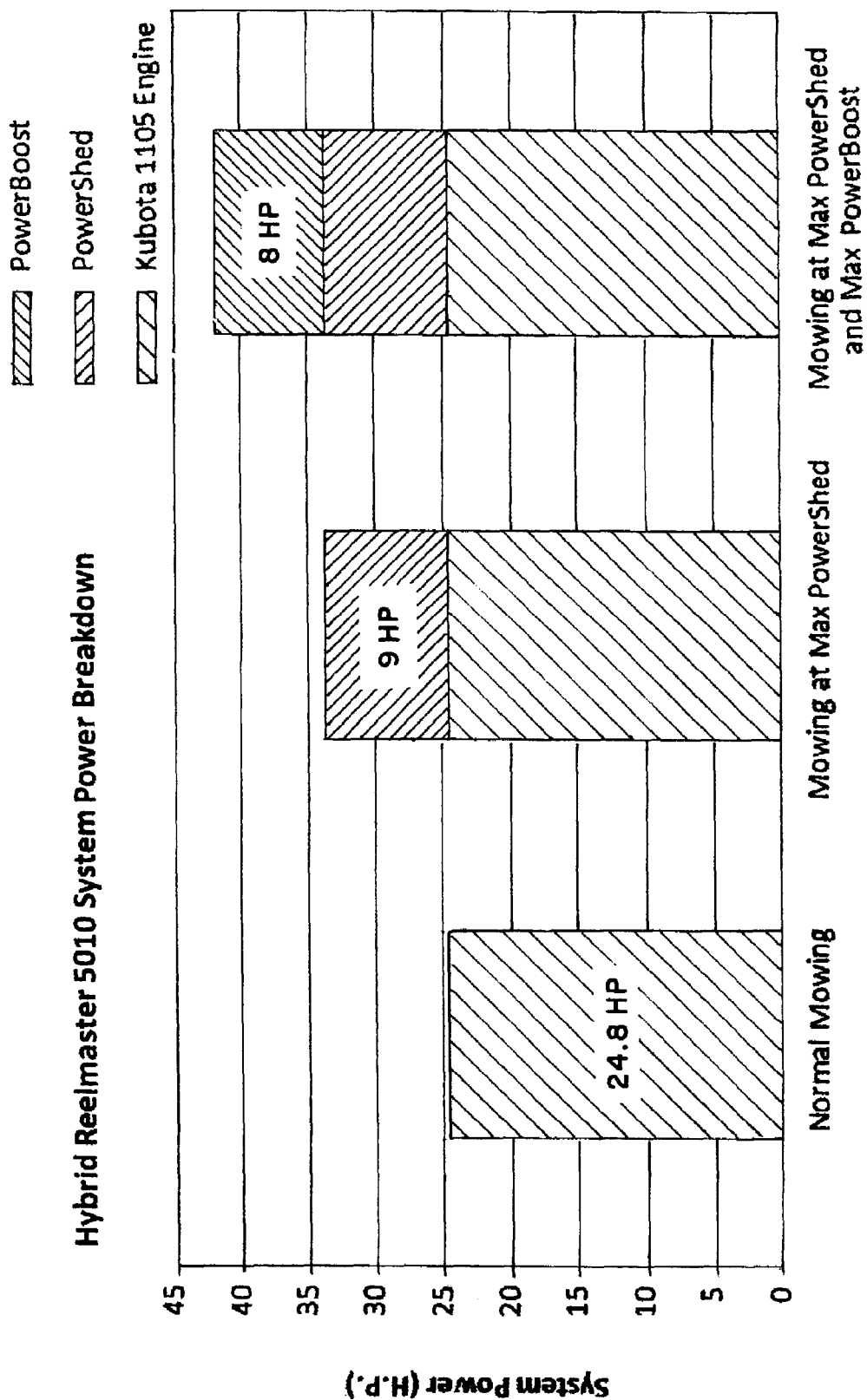
FIG. 5 is a bar chart of the operation of the hybrid electric system of this invention in the load ranges of FIGS. 2-4 showing the total equivalent power provided by the hybrid electric system of this invention in the various load ranges.

Combining the battery capability of battery pack 26 with a 24.8 hp diesel engine provides a power system capable of delivering up to approximately 42 hp peak intermittent power as illustrated in FIG. 5. It should be noted that the times at which this much horsepower is required from the power system will be few and of relatively limited duration during most mowing operations. A combined or total horsepower requirement from the hybrid electric system of this invention in the mid 30 hp range is typical when mowing terrain in excess of 10 degrees.

Various modifications of this invention will be apparent to those skilled in the art. For example, methods of sensing engine load other than monitoring fuel solenoid current could be used, such as monitoring a reduction in engine speed from a predetermined nominal value of engine speed as a measure of engine load. In addition, while cutting units 4 in one embodiment of this invention are carried on the frame of mower 2, such cutting units 4 could be provided on their own separate wheeled frame which is hitched to mower 2 for propulsion therewith and is either pushed in front of mower 2 or trailed behind mower 2 as a part of a tow frame. In this situation, the electrical power needed to operate the electric motors 28 of cutting units 4 would be supplied to such motors 28 by flexible electrical conductors extending back to motor generator 18 carried on mower 2. Thus, the scope of this invention is not to be limited to the details of the embodiment of the invention disclosed herein, but shall be limited only by the appended claims.

The invention claimed is:

1. A mower, which comprises:
   (a) a frame having a plurality of ground engaging wheels;
   (b) an internal combustion engine carried on the frame;
   (c) an electrical energy generating device mechanically coupled to the engine for being powered by the engine, wherein the generating device is configured to operate both in an electrical energy generating mode or as an electrical motor in an electrical energy consuming/mechanical power supplying mode;
   (d) an electrical energy storage device electrically connected to the generating device;
   (e) at least one grass cutting unit operatively connected to the frame;
   (f) at least one electrically powered device operatively connected to the frame which device is electrically connected to the generating device and to the storage device;
   (g) a traction drive system for propelling at least one of the ground engaging wheels on the frame, the traction drive system being operatively powered by at least the engine; and
   (h) a control system, which comprises:
      (i) an engine load sensor;
      (ii) a controller that is operatively connected to the sensor for controlling the operation of the generating device in accordance with engine load; and
      (iii) wherein the controller, upon receiving an engine load output signal from the sensor that is indicative of engine load above a first level, shifts at least in part the electrical energy needed to power the at least one electrically powered device from the generating device to the storage device, and wherein the controller, after shifting substantially entirely the electrical energy needed to power the at least one electrically powered device from the generating device to the storage device, shifts the generating device into the electrical energy consuming/mechanical power supplying mode in which the generating device is powered as a motor by electrical energy drawn from the storage device.

2. The mower of claim 1, wherein the shift in electrical energy from the generating device to the electrical storage device is proportional to engine load increases above the first predetermined level.

3. The mower of claim 2, wherein the sensor monitors current to a fuel solenoid in an electronic governor of the internal combustion engine as an indicator of engine load.

4. The mower of claim 1, wherein the internal combustion engine comprises a diesel engine.

5. The mower of claim 1, wherein the at least one electrically powered device comprises the at least one grass cutting unit.

6. The mower of claim 5, wherein the at least one grass cutting unit is carried on the frame.

7. The mower of claim 6, wherein the at least one grass cutting unit comprises a plurality of grass cutting units carried on the frame.

8. A mower, which comprises:
   (a) a frame having a plurality of ground engaging wheels;
   (b) an internal combustion engine carried on the frame, the internal combustion engine having an output shaft and having a nominal horsepower rating;
   (c) an electrical energy generating device that is mechanically coupled to the output shaft of the engine;
   (d) an electric motor that is mechanically coupled to the output shaft of the engine;
   (e) a traction drive system for propelling at least one of the ground engaging wheels on the frame, the traction drive system being operatively connected to and powered by the output shaft of the engine;
   (f) an electrical energy storage device electrically connected to the generating device and to the motor;
   (g) a plurality of electrically powered grass cutting units operatively connected to the frame, the cutting units being electrically connected to the generating device and to the storage device; and
   (h) a control system that is operatively connected to the generating device and to the motor for controlling the operation of the generating device and the motor, wherein the control system in response to instantaneous mechanical power requirements on the engine during mowing which exceed the nominal horsepower rating of the engine being configured to take at least one of the following two actions:
      (i) shifting at least in part the electrical energy needed to power the cutting units from the generating device to the storage device to thereby shed load on the engine to decrease the instantaneous mechanical power requirements on the engine; and
      (ii) operating the motor using electrical energy from the storage device to supply mechanical power to the output shaft of the engine that is additive to the mechanical power supplied from the engine itself to more fully meet the instantaneous mechanical power requirements.

9. The mower of claim 8, wherein the control system takes both of the electrical energy shifting and the motor operating actions sequentially in response to deficits between the instantaneous mechanical power requirements on the engine and the nominal horsepower rating of the engine, the electrical energy shifting action occurring first and the motor operating action occurring second and the electrical energy shifting action being simultaneously maintained when the motor operating action is occurring.

10. The mower of claim 9, wherein the electrical energy shifting action is done in a proportional manner in response to deficits between the instantaneous horsepower requirements and the nominal horsepower rating, the electrical shifting action occurring proportionally between a first non-shifted condition in which substantially all the electrical energy needed by the cutting units is supplied by the generating device and a fully shifted condition in which substantially all the electrical energy needed by the cutting units is supplied by the storage device.

11. The mower of claim 8, wherein the generating device and the motor comprise a single integrated motor generator.

12. The mower of claim 8, wherein the internal combustion engine comprises a diesel engine.

\* \* \* \* \*